United States Patent [19]

Lusignan

[11] Patent Number: 4,972,507
[45] Date of Patent: Nov. 20, 1990

[54] RADIO DATA PROTOCOL COMMUNICATIONS SYSTEM AND METHOD

[75] Inventor: Bruce Lusignan, Stanford, Calif.

[73] Assignee: Cellular Data, Inc., Palo Alto, Calif.

[21] Appl. No.: 242,958

[22] Filed: Sep. 9, 1988

[51] Int. Cl.[5] .............................................. H04Q 7/02
[52] U.S. Cl. ........................................ 455/51; 455/53; 455/57; 455/58; 340/825.08
[58] Field of Search ........................ 455/33, 16, 34, 51, 455/52, 53, 54, 56, 57, 58, 68; 379/58, 59, 60, 62; 370/95, 95.2; 340/825.08, 825.04

[56] References Cited

U.S. PATENT DOCUMENTS

| 4,466,001 | 10/1984 | Moore et al. | 340/825.08 |
| 4,586,040 | 4/1986 | Akiba et al. | 340/825.08 |
| 4,696,052 | 9/1987 | Breeden | 455/51 |

Primary Examiner—Benedict V. Safourek
Assistant Examiner—Ralph Smith
Attorney, Agent, or Firm—Flehr, Hohbach, Test, Albritton and Herbert

[57] ABSTRACT

A method and system of radio data communications especially useful in communicating over a special communications channel between a base station or cell site of a cellular telephone system and one of many user stations. Each user station communicates an alarm condition which may be either a burglar type alarm or an environmental alarm to the base station by responding on a compelled basis to a status request from the user station. The responses to such request are prevented from overlapping by fixed and unique time delays for each user station. This status response requires substantially a single bit width of data. If no response is received, this is also sensed. Secondly, a different category of request acquires from each selected user station several bits of data constituting an informational message, the request being sent to each user station in a cell in sequence, along with the particular unique time delay for each user station. Then the response are received in a group in sequence and are prevented from overlapping by use of these unique time delays.

4 Claims, 2 Drawing Sheets

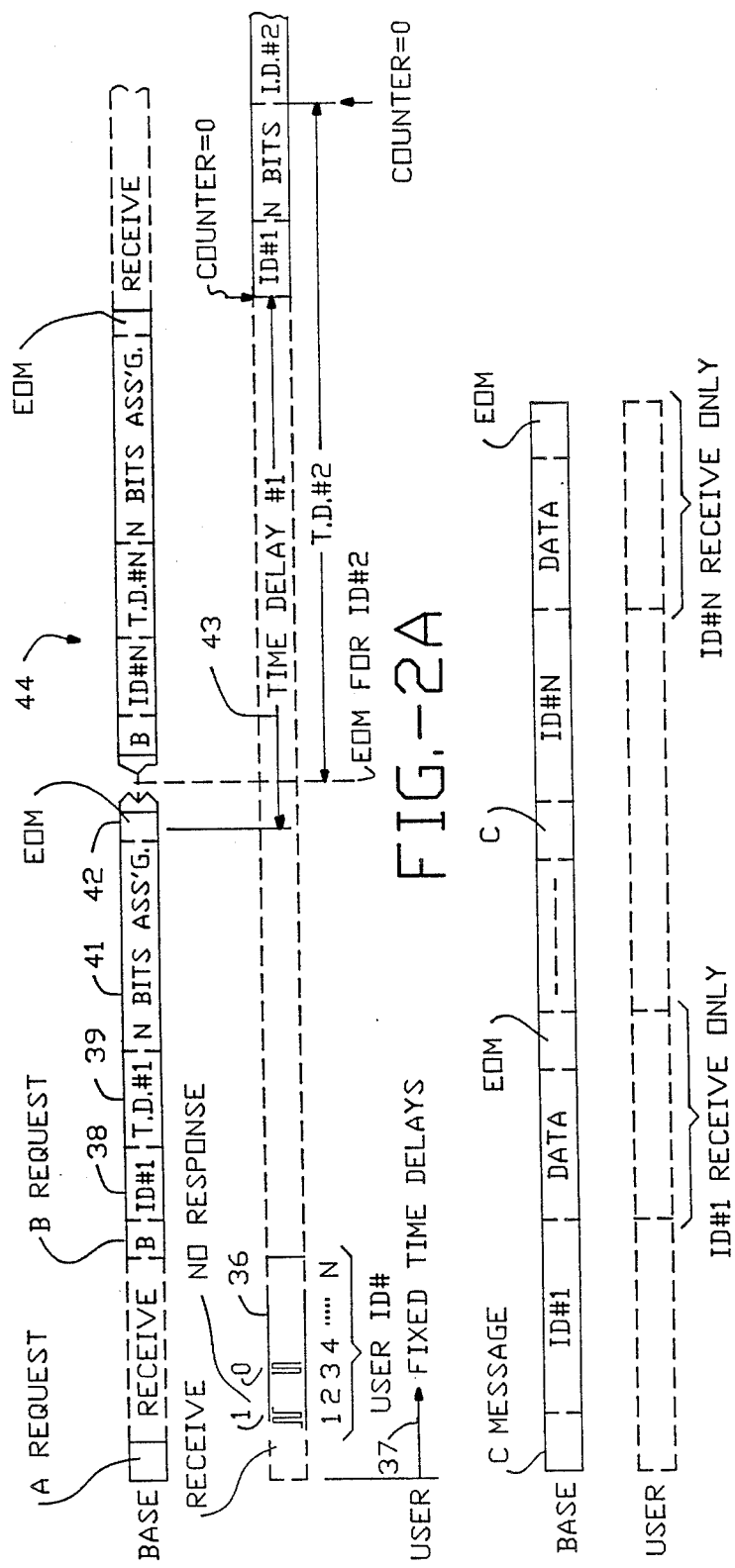

RADIO DATA PROTOCOL COMMUNICATIONS SYSTEM AND METHOD

The present invention is directed to a radio data communications system and method and more specifically to a system which may be effectively used for security alarm purposes with the use of communication channels provided by a cellular telephone system.

BACKGROUND OF THE INVENTION

As discussed in a co-pending application entitled "Cellular Data System," Ser. No. 247,040, filed Sept. 20, 1988, existing cellular system may be used to provide additional digital channels (for example, 1600) for communicating between a base station which is the cell site of a particular cell in the cellular system and any one or all of several hundred users located in that particular cell. For example, this might be done at a communication rate of two to three kilobits of data per second.

In order to improve service response and increase capacity, it is necessary to transmit data and communicate from base station to user and vice versa in as compact a fashion as possible.

OBJECT AND SUMMARY OF INVENTION

It is therefore a general object of the present invention to provide an improved method and system of radio data communications.

In accordance with the above object, there is provided a method where radio data communications is conducted between a base station and a plurality of user stations comprising the step of calling simultaneously from the base station all user stations with a first request to which the user stations are compelled to give a response. After a time delay unique to each user station, each of said user stations is caused to respond to the first request with a status report which occupies substantially one bit width of time on a common communications channel between the user stations and the base station. In response to those user stations having a certain status response, there is sent from the base station a second request for data from those user stations having a predetermined status, with the second request including a unique response time delay for each user station. After the time delay unique to each of those user stations, each of such stations is caused to respond in sequence to the second request for data.

BRIEF DESCRIPTION OF DRAWINGS

FIGS. 2A and 2B are timing diagrams illustrating the method of the present invention.

FIG. 3 is another timing diagram which is a simplified form of FIGS. 2A and 2B.

DESCRIPTION OF PREFERRED EMBODIMENT

Figure 1:
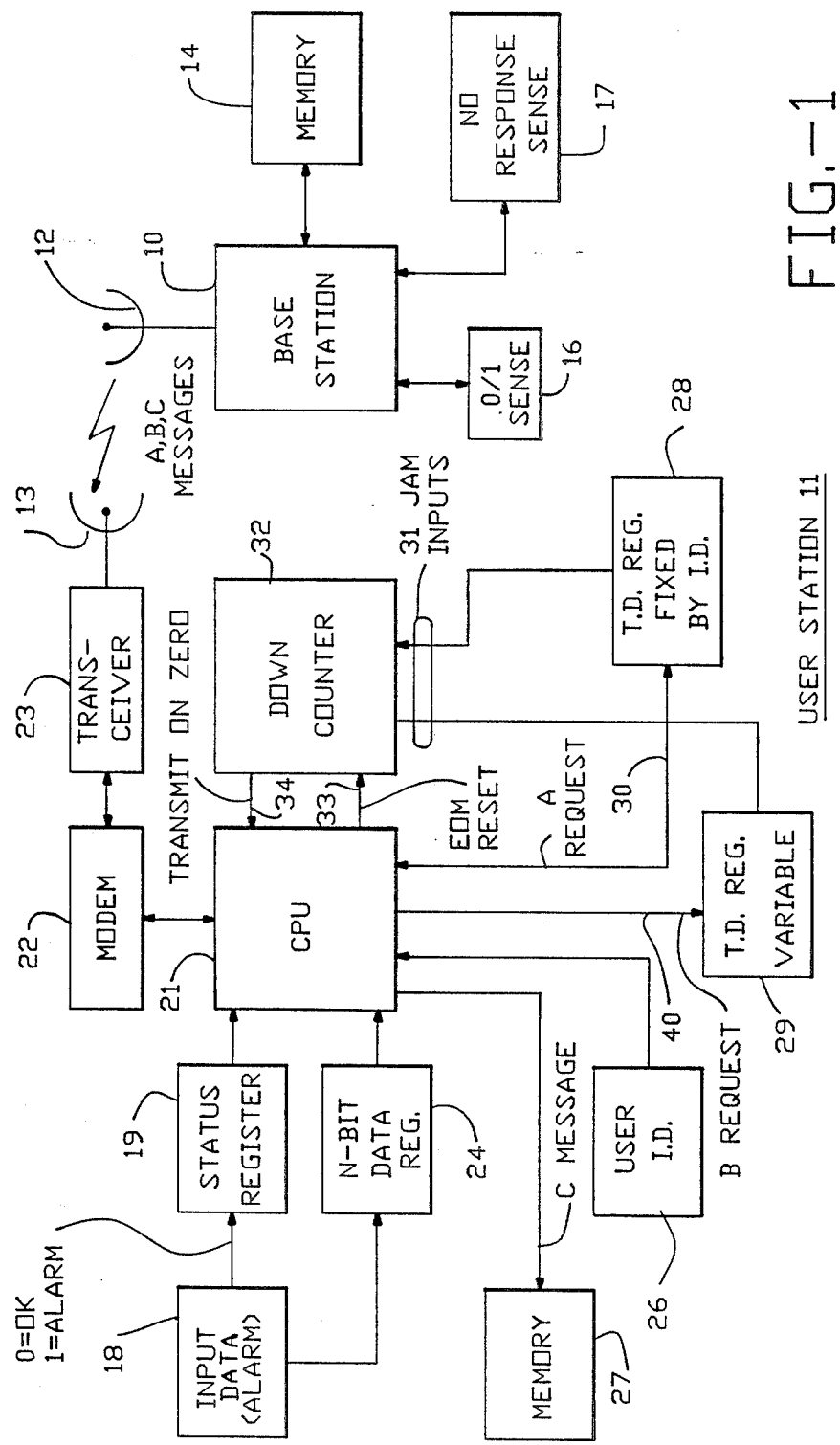
FIG. 1 is a block diagram of a communications system embodying the present invention.

FIG. 1 illustrates the base station 10 of the present invention which communicates with one or all of many user stations 11. Base station 10, as more completely described in the above-mentioned co-pending application, would be the cell site of a cellular telephone system with the user stations 11 being located in that particular cell. Base station 10 includes a unidirectional antenna which receives and sends transmissions to and from an antenna 13 of each user station 11. Such communications have been labeled in the context of the present invention as "A, B and C" messages.

Base station 10 also includes a microprocessor, modem and transceiver (not shown), along with auxiliary equipment such as the memory 14, and either software and/or hardware to sense received transmissions from the user station to be discussed in detail below. Particularly, there is a 0/1 bit sensing device (or software) 16 and a lack of response or no carrier sensing device 17. These units are used on the initial scan of the various user stations to determine their status.

As discussed above in the background of the invention, because of the limited digital capacity of a communications channel and the fact that there may be only a single common channel communicating with all the user stations in a particular cell, it is useful and necessary to minimize the demand on that communications channel. One particular use of the present system is as an alarm or security device for purposes of alerting police as to burglars or for environmental warning purposes; for example, fire, low temperatures, wind, etc. For such a type of service, all user stations must be monitored at, for example, 30 second intervals to determine if an alarm is present, and if the alarm system is working properly or has failed. In addition, it may be necessary to transmit a short message giving in detail the alarm condition to the base station or conversely, to transmit a short message to a selected user station.

Still referring to FIG. 1, the input data system is indicated as a block 18 which would include the foregoing environmental or security alarms. Connected to input data unit 18 is a status register 19 which receives, for example, a digital bit indication with a 0 indicating OK and 1—an alarm condition. This is coupled to a central processing unit (CPU) 21 which may communicate with base station 10 via a modem 22 and a transceiver 23 coupled to antenna 13.

To provide for communication of, for example, 100–500 500 bits of input data describing a particular alarm condition, an N-bit data register 24 is connected to input data unit 18 with its output to CPU 21. Since each user station must be identified as to location and type, the station is provided with a user ID illustrated as unit 26, also connected to CPU 21.

Finally, in a case where the base station 10 may transmit a data message to be retained by a user station 11, there is a memory 27 connected to CPU 21. The input line on the memory is labeled "C MESSAGE," since this is the type of data message that would be transmitted by the base station 10.

To provide for efficient packaging of data responses and also prevent the overlapping on a single communications channel of responses from several user stations, each user station has a fixed time delay register 28 which may typically be determined by its particular identification number and a variable time delay register 29. Such register 29 is made variable by the fact that it has actually transmitted to it from the base station 10 a specific time delay to be used, as will be described below. These two time delays are input by the jam inputs 31 into a down counter 32, which is coupled to CPU 21 by a reset line 33 and a transmit on zero line 34. Down counter 32 is reset when it receives a particular type of input; in this case, designated "END OF MESSAGE" (EOM).

Very briefly in operation when counter 32 is set by its jam inputs 31 to a particular number, it begins to count down and when it reaches 0 the output on line 34 causes a transmission from the user station to the base station of necessary data. In general, the down counter 32 acts as a time clock for user station 11.

All the foregoing has been described in block diagram form which might be implemented in discrete digital type circuitry. Alternatively, software could easily implement any of the foregoing (except for perhaps modem 22 and transceiver 23).

As briefly described in conjunction with FIG. 1, the base station 10 via its antenna 12 transmits to all of the user stations messages designated as A, B and C. These messages, as illustrated in FIG. 3, are transmitted in sequence and repetitively. This provides for scanning all user stations at least every 30 seconds. Thus, an alarm condition can be rapidly sensed. As illustrated in FIG. 3, after transmission of an "A" message the base station 10 goes into a receive mode and the same is true of the "B" message. The "C" message, of course, relates to transmission of data from the base station to a particular user station 11. If duplex antennas are present in the base station, then of course there need be no separate receive interval.

FIGS. 2A and 2B illustrate in detail the A, B and C messages. First referring to FIG. 2A, there is a timing bar indicated relating to the Base station 10 and a juxtaposed bar designated User, which indicates transmissions or responses to and from the user station. If base or user is receiving, this is indicated as a dashed portion and if the bar lines are solid, they are transmitting. Initially, the A message or request is simultaneously transmitted to all user stations on a single communications channel. The A request is in effect a compelled response command which states that each user station is to give a status response; that is, is there an alarm condition or is it OK?

The user station response, as illustrated in portion 36 of the timing diagram, is a sequential response from each user station designated with ID numbers 1, 2, 3, 4 ... N, with each response being substantially 1 bit width of time. Thus, as illustrated, the user station with ID 1 broadcasts that it has an alarm and thus a binary '1' is broadcast in a typical, for example, frequency shift keying mode where the '1' is indicated by a transition from a high to a low value. Similarly, the user station with ID 3 to transmit a binary '0' would indicate a low to high level. However, with respect to user station 2, if neither one of these is received, which might be the case, then this indicates a malfunction of the base station. Either the radio transmitter would have no carrier to broadcast or would broadcast a carrier with no data on it.

To prevent these automatic compelled responses from interfering or overlapping each other, as indicated by the time axis 37, fixed time delays are provided which are unique to each user station. And referring to FIG. 1, this is the time delay in fixed time delay register 28, as discussed previously. Note that this time delay register is activated by an 'A' request on the line 30 to activate the jam inputs 31 on down counter 32. Then, when the proper time delay occurs clocked by a countdown to zero, a response is transmitted. In this way very rapid status reports are received from perhaps several hundred user stations in a single cell in a very compact manner. And only a single bit width time is required.

Next, still referring to FIG. 2A and the Base station bar timing diagram, the 'B' request message is sent out by the base station to selected user stations. This B request is in effect a command to a selected user station to transmit a block of data. The B request includes the B request command, indicating to all user stations that this is a B-type request where data is to be transmitted from the user. Thereafter, as indicated at bar portion 38, the specific address of, for example, user 1 or ID 1, is sent which includes with it the specific time delay, T.D. #1, indicated at 39 which is to be utilized in transmitting from that user station to the base station the N-bits assigned which is designated at 41. Then there's an "end of message" (EOM) indication 42.

Referring briefly back to FIG. 1, this B request is received on the line 40 from the CPU which has sensed it and identified it. Thereafter, when the particular user station recognizes its ID number, it stores in variable time delay register 29 the particular time delay for that B request. Then after the end of message reset on line 33 to counter 32, the jam inputs 31 are activated and timing will begin. This is indicated by the time delay No. 1 line 43 in FIG. 2A. This time delay is long enough so that other B requests indicated generally at 44 as B request No. 'N' may be made of other selected user stations. Referring back to time delay No. 1 indicated at 43, at the end of this time delay, the down counter 32 (see FIG. 1) reaches 0 and then at that point the user station responds with its I.D. number and with the N-bits of data from the N-bit data register 24; and that is the end of the B category transmission from that particular user station. Then, as indicated, the next user station perhaps I.D. 2 transmits when its particular down counter 32 reaches 0. In the above manner, with regard to a B request, all of the user stations for which further information is desired as to, for example, their alarm condition, are sequentially addressed and then information is efficiently received in a tightly packaged common and sequential reception group provided by the designated time delays.

In typical usage the user stations to be given a B request might be those which have indicated an alarm condition. Thus, the N-bits of data would give further information as to type of alarm or perhaps the specific environmental condition which is being monitored.

Lastly, a third category of message, C messages, is shown in FIG. 2B, where it is desired to transmit in a normal manner information to a particular user station, to, for example, change a parameter of that station or program it to perform a certain function. The C message is sent with a particular I.D. number and then data is immediately sent to the particular user station which has that I.D. number. Thus, in the user timing bar of FIG. 2B, data from the first message in the sequence is received by I.D. 1 only and then so on to user station 'N.'

Again referring to FIG. 3, the sequence of A, B and C messages is repeated ideally over 30 second intervals to provide for alerting the base station rapidly of any alarm condition.

Thus, the foregoing technique allows the transmission of thousands of kilobits of data to and from a base station and several user stations on a relatively restricted communications channel. This is accomplished by use of an effective time division multiplexing technique. This type of protocol improves service response, increases capacity and minimizes interference.

What is claimed:

1. A method of radio data communications between a base station and a plurality of user stations comprising the following steps:

calling simultaneously from the base station all user stations with a first request to which the user stations are compelled to give a response;

after a time delay unique to each user station causing each of said user stations to give said compelled response to said first request with a status report which occupies substantially one bit width of time on a common communications channel between said user stations and said base station;

in response to those user stations having a certain said status report, sending from said base station a second request for data from those user stations having a predetermined status, with said second request including a unique answer time delay in which to response to said second request for each user station; and causing each of such stations to respond after said unique answer time delay to said second request for data.

2. A radio data communications system between a base station and a plurality of user stations comprising:

built-in and permanent unique time delay means for each user station for responding to a compelled response transmitted by said base station;

means for said base station to receive status information from all user stations in substantially one bit width of time on a common communications channel between said base station and said user stations on said compelled response basis initiated by said base station said unique time delay means preventing overlapping responses;

means included in said base station for requesting data from user stations selected in response to said status information and identified by unique identification numbers, including in such request by said base station a unique answer time delay for each selected user station;

means included respectively, in said user stations, for responding to the base station after said unique answer time delay of said user station to prevent overlapping responses from said selected user stations.

3. A system as in claim 2 where each said user station includes register means for storing the unique answer time delay received from the base station, and including counter means for receiving said stored answer time delay and determining the time of transmission of said data from said user station to said base station.

4. A system as in claim 2 where said built-in unique time delay for said compelled response regarding status for each base station is related to a unique identification number of each user station.

* * * * *